United States Patent [19]

Cho

[11] 4,403,967
[45] Sep. 13, 1983

[54] SELF TEACHING INSTRUMENT

[76] Inventor: Kyu S. Cho, K. P. O. Box 341, Seoul, Rep. of Korea

[21] Appl. No.: 304,262

[22] Filed: Sep. 21, 1981

[30] Foreign Application Priority Data

Sep. 26, 1980 [KR] Rep. of Korea ............ 6262/1980[U]
Sep. 26, 1980 [KR] Rep. of Korea ............ 6266/1980[U]
Oct. 21, 1980 [KR] Rep. of Korea ............ 6745/1980[U]

[51] Int. Cl.³ ............................................. G09B 5/02
[52] U.S. Cl. ................................................. 434/337
[58] Field of Search ............... 434/327, 335, 337, 342, 434/348, 349

[56] References Cited

U.S. PATENT DOCUMENTS 3,350,793 11/1967 Bushnell ............................ 434/337
3,541,699 11/1970 Baker, Jr. ........................... 434/337
3,645,012 2/1972 Fiehler et al. ...................... 434/337
3,696,527 10/1972 Dickman ............................ 434/337

Primary Examiner—William H. Grieb
Attorney, Agent, or Firm—Armstrong, Nikaido, Marmelstein & Kubovcik

[57] ABSTRACT

A self-teaching instrument designed to enable answering a multiple-choice test rapidly and precisely has a separate card compartment attached to the lower front of the unit. Cards can be pushed out vertically one at a time by a roller which is controlled by a driving portion. A card carrier with two hooks transports the card from the card compartment to a predetermined position by a conveyer. On both sides of the conveyer conductive films are attached at six equally divided places. The conductive films aid in locating the holes on the card for hole detectors. In the top row, on the top of the instrument, there are four switches for selecting answers. In the lower row there are the power switch, reverse and forward switch buttons. The upper portion of the switch panel has a transparent viewing screen for visualizing a problem and selected answers. For simplified viewing this is built at a slight angle. Beyond this screen there are correct or wrong answer indicators, counters, speaker and a card recovery container.

1 Claim, 7 Drawing Figures

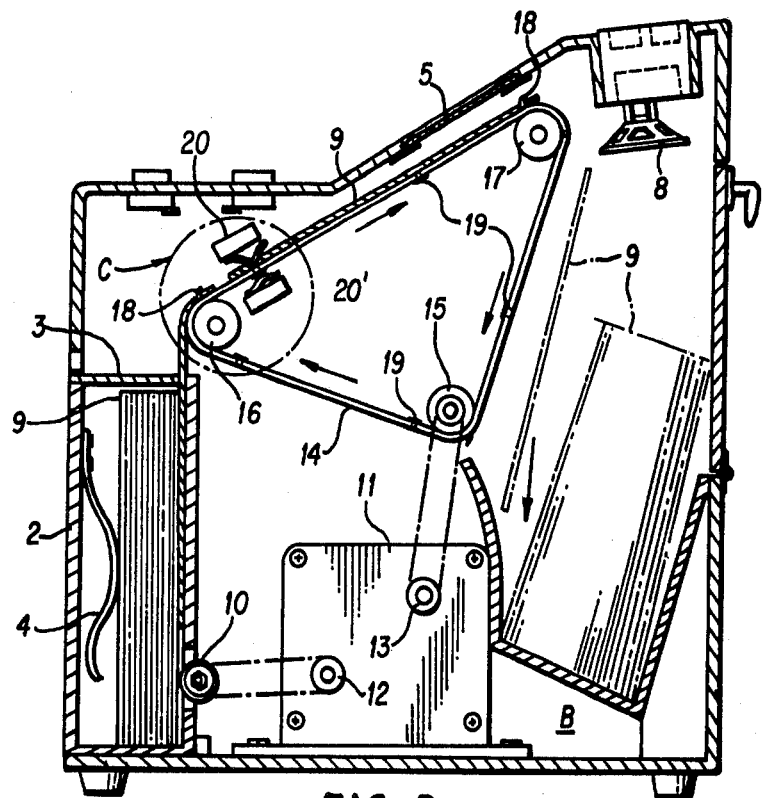
FIG. 2
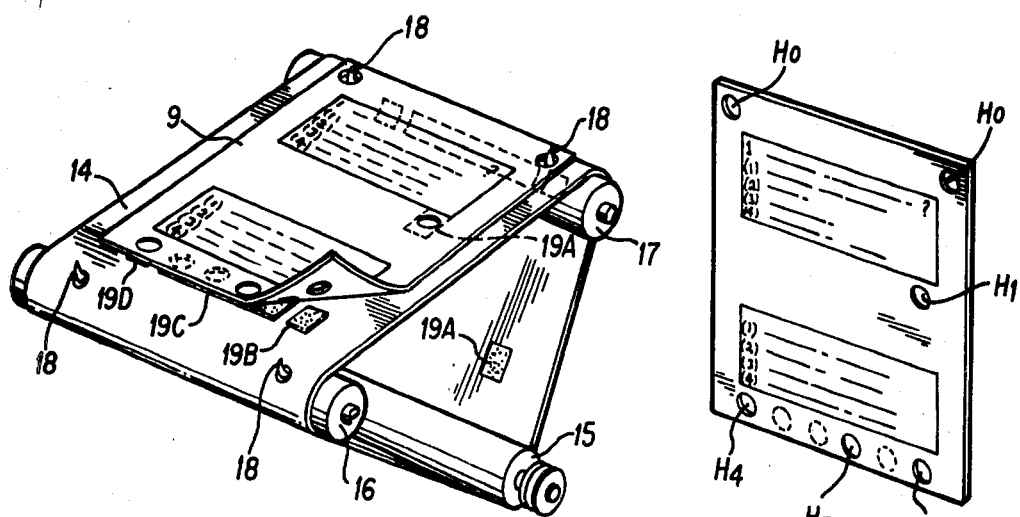
FIG. 3
FIG. 4

SELF TEACHING INSTRUMENT

BACKGROUND OF THE INVENTION

Conventional self-teaching devices and test kits consist of exercise books or examination papers with supplementary answer books. In these cases, the students have to constantly consult the supplement for correct answers. This is rather tedious, time consuming and more often discourages the students from studying. This self-teaching instrument is designed to eliminate the above-mentioned problems and stimulate enjoyable self-study.

SUMMARY OF THE INVENTION

This invention is an instrument which will provide quick and statistical "instant answers". The "instant answer" must be clear and exact, and encourages the students to study.

This instrument also provides a multiple-choice test which gives a psychological impact to the students.

An additional advantage of the invention is that if the student cannot solve the problems by himself, the instrment will guide him to select correct answers with a rational approach.

The foregoing and other advantages of the invention will be made more apparent from the following detailed explanation with the accompanying drawings.

BRIEF DESCRIPTION OF THE DRAWING

FIG. 2 is a cross-sectional view of FIG. 1;

FIG. 3 is an enlarged perspective view of the card carrier inside the instrument;

FIG. 4 shows the card structure containing a multiple-choice problem and its commentary solution according to the invention;

DETAILED DESCRIPTION OF THE INVENTION

Figure 1:
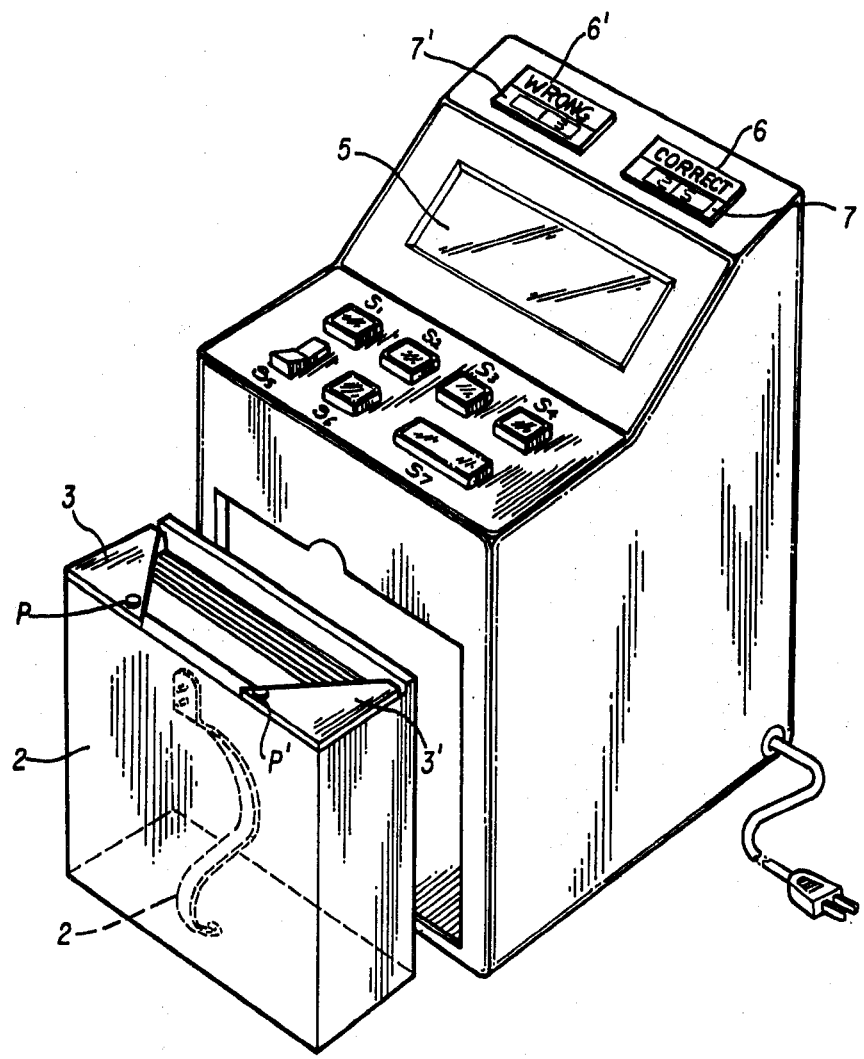
FIG. 1 is a perspective view of the instrument for a multiple-choice test.

In FIG. 1, the main body 1 of the instrument has a lower front portion containing a card compartment 2. On each side of the top of the card compartment 2, there are two partial covering plates 3,3' which are connected with springs (not shown) at P,P' and can be turned to open to manipulate cards 9. The plates 3 and 3' also control vertically outcoming cards, one at a time, which are pushed up by a flexible roller 10 connected to a drive means at 12.

On the top of the instrument there is a switch panel. The top row of four buttons ($S_1$ to $S_4$) correspond to the four examples of a multiple-choice problem.

On the lower bottom row there are three switches; a power switch ($S_5$), a reverse switch ($S_6$), and a forward switch ($S_7$) for the cards. These switches ($S_5$ to $S_7$) are operatively connected to the drive means.

On the upper part of this switch panel is a transparent viewing screen 5 built at a slight angle so that the user can read his questions and answers.

Next to the screen 5, farthest from a viewer, there are two indicators 6 is and 6'. One indicator 6 is marked as "CORRECT" and the other one 6' is marked as "WRONG". Below these indicators, counters (or graders) 7,7' are located. Under these indicators and the counters, two oscillators and lamps are hidden. Whenever a viewer identifies a right answer, the lamp will be turned on, and the "CORRECT" sign appears simultaneously, adding up 1 to the counter 7; the osillator starts to work and then a sound for "CORRECT" is emitted from the speaker 8.

If the viewer pushes an incorrect button switch for the answer, the other lamp turns on, the "WRONG" sign appears, it counts up 1 to the "WRONG" side of the counter, and then the other oscillator makes a different sound for the wrong answer.

FIG. 2 shows a cross-sectional view of the instrument. A plate spring 4 is provided having one end bolted to the front side of the inside of the card compartment 2. The spring 4 pushes the cards 9 toward the flexible roller 10. The roller 10 rolls up the card vertically one card at a time. The plates 3,3' control the outcoming cards.

Inside the instrument, a conveyer 14 proceeds by a motor (not shown) which is connected at 13 and carries the card 9 to the collecting section (B) after furnishing all information through the screen 5. The card 9 is loaded at the roller 16 by two rows of hooks 18,18 through holes ($H_O$, $H_O$) in the card and unloaded at the roller 17.

On both sides of the conveyor 14, conductive films 19 are attached at 19A, 19B, 19C, and 19D to aid the hole detectors. These conductive films attached to both sides of the conveyer 14 are interconnected with the same material. These conductive films are relaying the circuit of the hole-detectors 20,20' and locating four holes ($H_1$ to $H_4$) of FIG. 4.

FIG. 4 displays problem and answer cards containing six holes. The top two holes ($H_0$, $H_0$) are already described. Remaining four holes ($H_1$ to $H_4$) identify correct or wrong answers.

When the students answer correctly, the following answering cards proceed without appearing in the screen 5. However, if the viewer pushed the wrong button, the answering card with a rational explanation follows.

Figure 5:
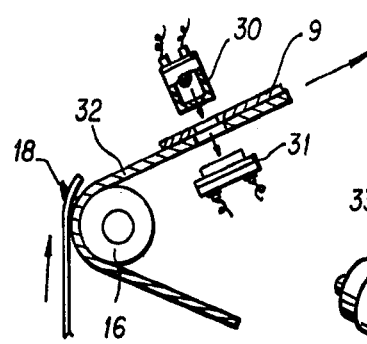
FIG. 5 shows the modified hole detectors inside the circle (C) indicated in FIG. 2.

FIG. 5 shows modified hole detectors circled (C) in FIG. 2. These photoelectronic hole detectors consist of light sources 30 and light receiving elements 31.

Figure 6:
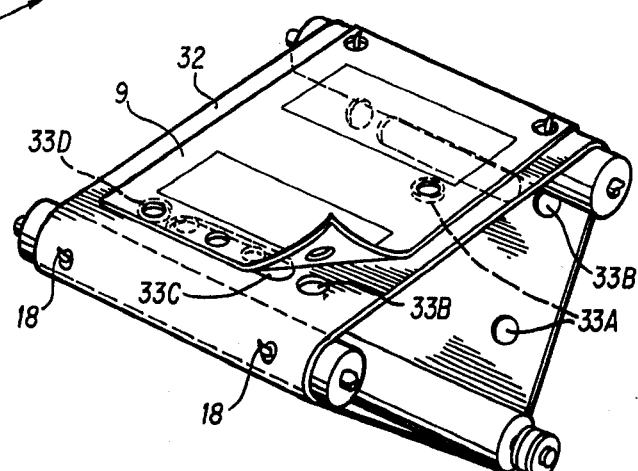
FIG. 6 is the perspective view of the modified card carrier for the hole detectors in FIG. 5.

When the students identify the correct answer, the light passes through the holes of the card 9 and the conveyer 32 as shown in FIG. 6, and the apparatus then functions as described earlier. The holes (33A to 33D) on the conveyer 32 correspond to the conductive films (19A to 19D) on the conveyer 14.

Whenever the students push the wrong button, the light cannot pass through and the apparatus will proceed as described earlier for the wrong answer.

Figure 7:
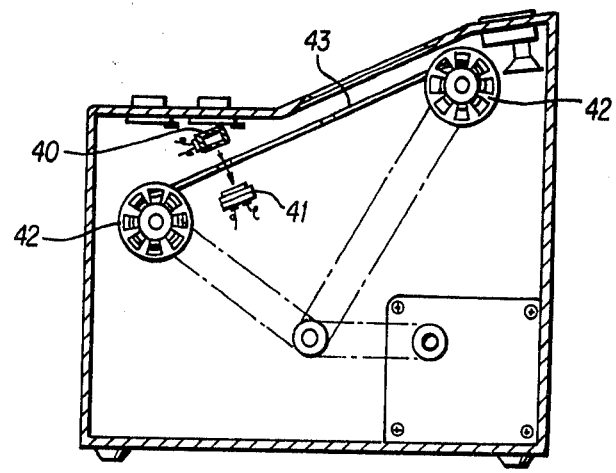
FIG. 7 is a cross-sectional view of the tape cartridge with the photoelectronic hole detectors.

FIG. 7 is a cross-sectional view of the tape cartridge 42 with the photoelectronic hole detectors, which simplifies the structure of FIG. 2. There is a cartridge 42 for tapes 43 in place of the cards and the photoelectronic hole detectors.

Multiple-choice problems and answers are on the tapes 43 These tapes can be pre-programmed with aid of a computer.

The above-mentioned instrument fulfills the function of the invention. Namely, the instrument of the invention provides quick, statistical and clear instant answers for self-teaching students.

What is claimed is:

1. A self-teaching machine comprising:
   a main body having a lower front portion, and an upper portion, said upper portion having a viewing screen therein;
   a card compartment removeably fitted in said lower front portion, said compartment having a front wall and a rear wall;
   a plurality of individual flexible cards vertically oriented in said card compartment, each card having a length, a pair of upper corners, and a pair of transport holes, each hole being adjusted one of said upper corners;
   a plate spring mounted on said front wall biasing said vertically oriented cards towards said rear wall,
   a collecting section in said main body receiving said individual cards;
   means extending through said rear wall for moving one of said cards at a time vertically upwards;
   means for individually conveying said cards to and past said viewing screen, said means for conveying receiving said cards one at a time from said means for vertically moving and, subsequently dropping said cards under the influence of gravity into said collecting section; said means for conveying comprising a plurality of rollers, a flexible belt disposed over said rollers, and a plurality of pairs of hooks on said belt spaced apart from each other at a distance greater than said pair of hooks being positioned to catch said pair of transport holes in one card; and
   means for intermittently driving said means for vertically moving and said means for conveying upon a command by a user.

* * * * *